US006373051B1

(12) United States Patent
Hayakawa et al.

(10) Patent No.: US 6,373,051 B1
(45) Date of Patent: Apr. 16, 2002

(54) CHARGE INVERSION MASS SPECTROMETRY WHICH RELIES UPON THE DISSOCIATION OF A NEUTRAL SPECIES

(75) Inventors: Shigeo Hayakawa, Osaka; Norio Morishita; Kazuo Arakawa, both of Gunma-ken, all of (JP)

(73) Assignees: Shigeo Hayakawa, Osaka; Jeol Limited, Tokyo, both of (JP)

( * ) Notice: Subject to any disclaimer, the term of this patent is extended or adjusted under 35 U.S.C. 154(b) by 0 days.

(21) Appl. No.: 09/504,845

(22) Filed: Feb. 16, 2000

(30) Foreign Application Priority Data

Feb. 17, 1999 (JP) .......................................... 11-038397

(51) Int. Cl.$^{7}$ ................................................ B01D 59/44
(52) U.S. Cl. ....................................................... 250/282
(58) Field of Search ................................ 250/282, 281, 250/284

(56) References Cited

U.S. PATENT DOCUMENTS 4,731,533 A * 3/1988 Vestal ........................ 250/292
5,545,894 A 8/1996 Funsten et al.

FOREIGN PATENT DOCUMENTS

SU 001067972 A 5/1992

OTHER PUBLICATIONS

S. Hayakawa et al., "Definitive Evidence for the Existence of a Long–Lived Vinylidene Radical Cation, H2C=C+" The Journal of Chemical Physics, vol. 110, pp. 2745–2748 (1999).

S. Hayakawa et al., "Study of the Dissociation of Neutral Intermediates Using a Charge Inversion Mass Spectrometry", The Journal of Chemical Physics, vol. 112, pp. 8432–8435 (2000).

S. Hayakawa et al., "A New Technique to Study the Dissociation of Energy–Selected Neutral Intermediates" International Journal of Mass Spectrometry, vol. 202, pp. A1–A7 (2000).

S. Hayakawa et al., "Discrimination of Isomers of Dichlorobenzene Using Charge Inversion Mass Spectrometry", J. Mass Spectrom. Soc. Japan, in press (2000).

S. Hayakawa et al., "Dissociation Mechanism of Electronically Excited $C_3H_4$ Isomers by Charge Inversion Mass Spectrometry", International Journal of Mass Spectrometry and Ion Processes, 171 (1997) 209–214.

International Journal of Mass Spectrometry and Ion Processes, vol. 151 (1995), Shigeo Hayakawa, et al., "Discrimination of $C_3H_4^+$ Isometric Ions by Charge Inversion Mass Spectrometry Using an Alkali Metal Target", pp. 89–95.

International Journal of Mass Spectrometry and Ion Processes, vol. 171 (1997), Shigeo Hayakawa, et al., "Dissociation Mechanism of Electronically Excited $C_3H_4$ Isomers by Charge Inversion Mass Spectrometry", pp. 209–214.

(List continued on next page.)

*Primary Examiner*—Jack Berman
*Assistant Examiner*—Anthony Quash
(74) *Attorney, Agent, or Firm*—Banner & Witcoff, Ltd.

(57) ABSTRACT

A positive ion of an isomer is generated in an ion source and introduced into a target chamber filled with a target alkali metal so that it is dissociated into a neutral fragment which is then subjected to charge inversion to generate a negative ion. By measuring the mass spectrum of the negative ion, the isomer can be detected at a higher resolution than has been possible by CID and other conventional mass spectroscopic techniques.

6 Claims, 8 Drawing Sheets

OTHER PUBLICATIONS

International Journal of Mass Spectrometry and Ion Processes, vol. 90 (1989), S. Hayakawa, "Dissociative Neutralization of $H_2^+$ and $HD^+$ Ions Using a Negative Ion Detection Method", pp. 251–262.

Journal of the American Chemical Society, vol. 109 (1987), Rong Feng, et al. "Gaseous Negative Ions from Neutral Molecules and Positive Ions; New Information for Neutralization–Reionization Mass Spectrometry", pp. 6521–6522.

46th Annual Conference on Mass Spectrometry, "Book of Abstracts", Takasaki, Gunma, Japan, pp. 83–84, May 13–15, 1999, 1998.

46th Annual Conference on Mass Spectrometry, "Book of Abstracts", Takasaki, Gunma, Japan, pp. 153–154, May 1–15, 1999, 1998.

47th Annual Conference on Mass Spectrometry, "Book of Abstracts", Takasaki, Gunma, Japan, pp. 240–241, May 12–14, 1999, 1999.

American Institute of Physics, The Journal of Chemical Physics, "Definitive Evidence for the Existence of a Long–lived Vinylidene Radical cation, $H_2C=C^{+\cdot}$", pp. 2745–2478, vol. 110, No. 6, Feb. 8, 1999.

* cited by examiner

CHARGE INVERSION SPECTRA WITH Cs USED AS TARGET

*Fig. 4* CID SPECTRA WITH K USED AS TARGET

CHARGE INVERSION SPECTRA WITH K USED AS TARGET

*Fig. 6*
CID AND CHARGE INVERSION SPECTRA OF $CD_3OH^+$
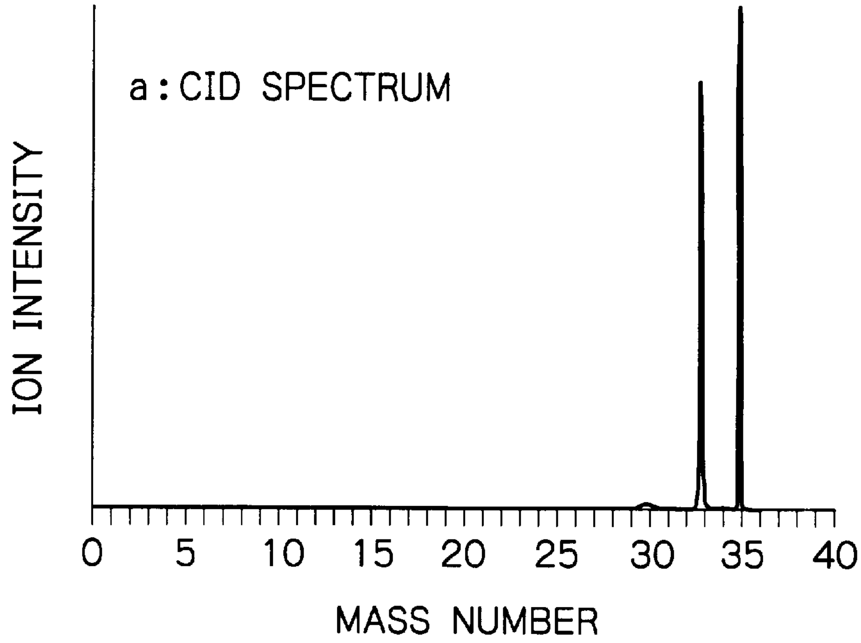
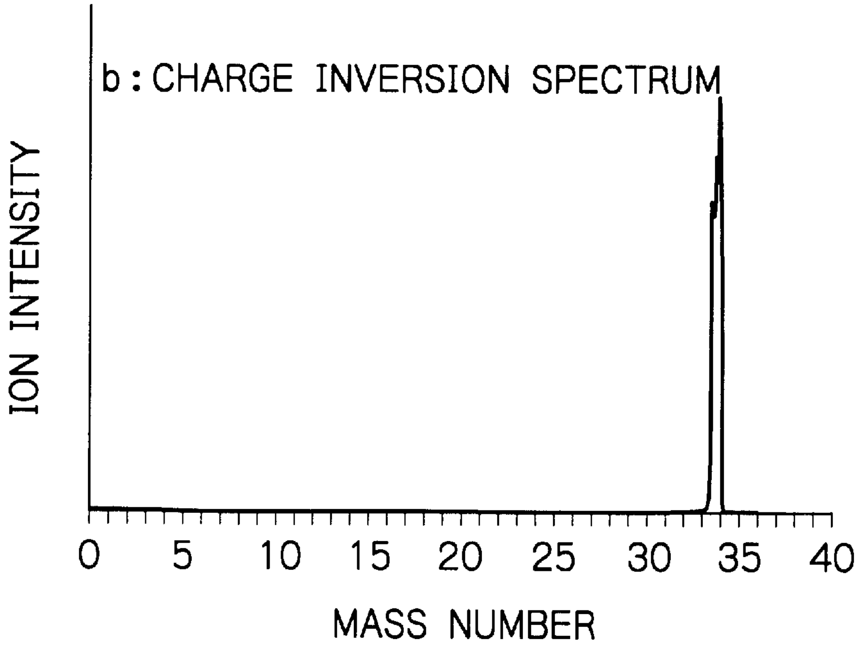

Fig. 7
CID AND CHARGE INVERSION SPECTRA OF $CD_3OD^+$
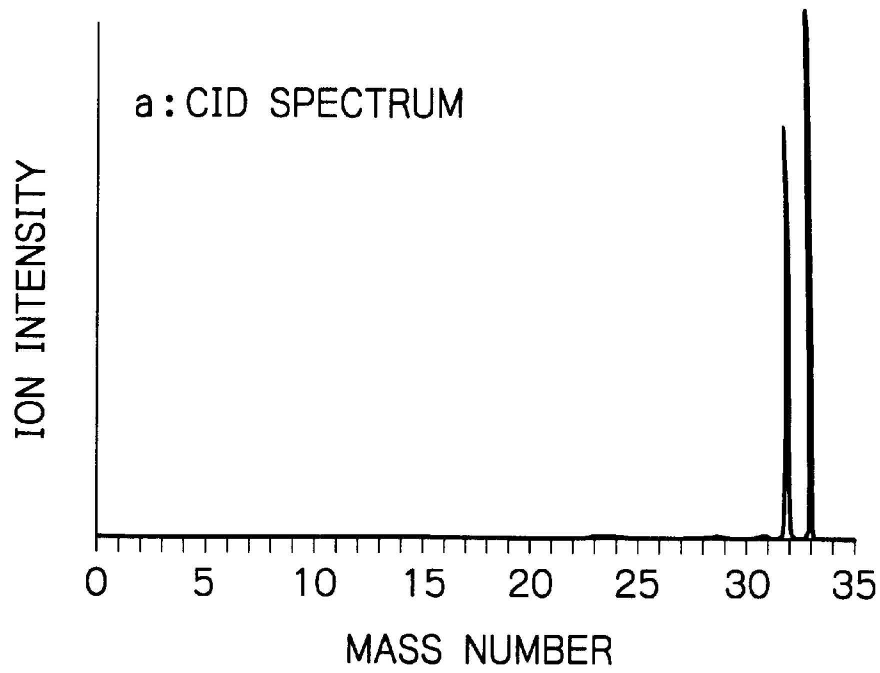
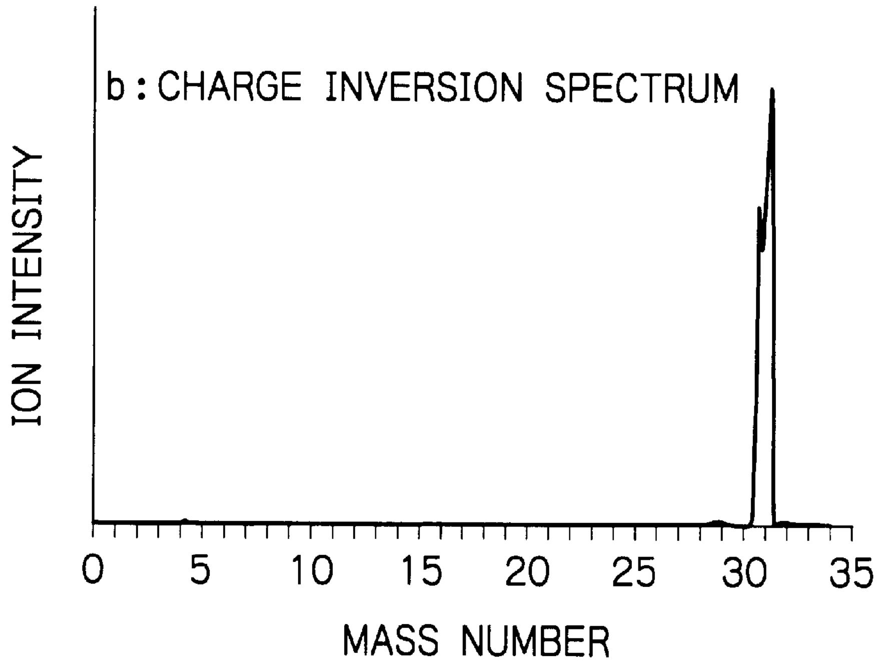

INTERNAL ENERGY DISTRIBUTION IN CID USING $W(CO)_6^+$

INTERNAL ENERGY DISTRIBUTION IN CHAGE INVERTED MASS SPECTROSCOPY USING $W(CO)_n^+$ (n=4-6)

CHARGE INVERSION MASS SPECTROMETRY WHICH RELIES UPON THE DISSOCIATION OF A NEUTRAL SPECIES

BACKGROUND OF THE INVENTION

This invention relates to a method of charge inverted mass spectroscopy that is characterized by its ability to differentiate between isomers and other substances that have been impossible to differentiate by the conventional mass spectroscopic techniques. The main thrust of mass spectroscopy as compared with other analytical techniques is that it is capable of determining the mass of the molecule of which a certain substance is made while allowing for microanalysis of the substance.

The conventional techniques of mass spectroscopy have the major drawback of permitting only low resolution in isomer differentiation. Having high resolution in isomer differentiation, the method of the invention allows for differentiation, identification and quantitative determination of many substances in small quantities and finds utility in those areas where analyses have been performed by chromatography and mass spectroscopy.

Dioxins have different forms of isomers depending upon the substitution position of chlorine atoms and the level of toxicity differs considerably from one isomer to another. With the present technology, it is an extremely painstaking job to separate dioxin isomers and determine their quantities. The efficacy and toxicity of medicines are also variable by great extent from one isomer to another. The present invention offers the advantage that individual isomers can be differentiated and quantitatively determined from much smaller quantities of samples than have been required in the prior art technology.

Recent improvements on mass spectroscopic technology have made it possible to determine the molecular weights of molecular species of different masses by measuring mass spectra using various ionization methods. Even molecules having the same mass number can be differentiated by electron impact spectra if they differ in elemental composition and other factors. However, difficulty is often encountered in differentiating and determining the structures of isomers having the same mass number but different structures.

In collision-induced dissociation (CID), generated ions are bombarded against a target such as a rare gas to produce ions of the same polarity by dissociation and as for certain molecules, their isomers can be differentiated by analyzing the spectra of the thus product ions. However, many substances still exist that defy differentiation of their isomers by CID. An improved modification of mass spectroscopic technology is desired that retains its capability for microanalysis and which yet allows for higher resolution in isomer differentiation.

CID is a technique relying upon the dissociation of generated ions. Having electrical charge, ions can be analyzed by electromagnetic means such as an electric or magnetic field and, in addition, they are readily detectable. These features make CID suitable for microanalysis. Radical ions, as contrasted with neutral species, have one or more electrons in excess or deficiency, so the activation barrier in the isomerization of radical ions is sufficiently lower than that for neutral species and the former are by far more likely to be isomerized than the latter. "Neutral species" is the generic term for electrically neutral particles and covers not only atoms, molecules, radicals and clusters but also other excited particles that are electrically neutral.

Another feature of CID is that ions are excited to varying internal energy levels and they are dissociated to give a spectrum comprising one dissociated ion superposed on another. This means that although microanalysis is possible by CID, the resolution in isomer differentiation is so low that certain compounds are even impossible to identify.

SUMMARY OF THE INVENTION

With a view to dissociating ions of neutral species in spite of high isomerization barrier, the present invention employs a single-electron transfer reaction between an incident positive ion and a target such as an alkali metal that has low ionization energy. In the invention, neutralization with the target takes place as a near resonant reaction whose probability of occurrence is high. In addition, the generated neutral species in the excited state has a narrow enough energy distribution to increase the likelihood for the occurrence of a specific dissociation.

The present invention is further characterized in that the neutral species of ion that has been generated by dissociation undergoes a second electron transfer reaction with the target to become a negative ion, which is analyzed and determined quantitatively by mass spectroscopy in an electric or magnetic field. This feature contributes to provide a higher resolution in isomer differentiation than the conventional mass spectroscopic technology. The method of the invention performs analysis and detection of a particular ion itself and, hence, it allows for analysis and quantitative determination in small quantities, which is one of the salient features of mass spectroscopy.

In the method of the invention, a positive ion is generated from an ion source that ionizes a substance such as an isomer, the generated positive ion is mass separated by mass spectroscopy in an electric or magnetic field, the mass separated positive ion is launched into a target chamber filled with a target in the form of alkali metal vapor, charge inversion is allowed to occur in the target chamber to produce a negative ion, the produced negative ion is taken out of the target chamber, and the mass spectrum of the recovered negative ion is analyzed to identify the substance of interest and determine its quantity.

When a substance is ionized, two types of ions are produced; one is ions that result from the intact substance (and which are commonly called "parent ions") and the other is various ions that result from the broken substance ("fragment ions"). The characteristics of the substance are best retained by the parent ions, so in the present invention, the parent ions are selectively introduced into the target chamber. However, the fragment ions are also introduced into the target chamber since they represent the characteristics of a partial structure of the substance.

In electron impact ionization, the parent ions best reflect the structure of the substance. In other ionization techniques such as chemical ionization (CI) and fast atom bombardment (FAB), a hydrogen ion or an alkali metal ion are attached to the molecule to produce a quasi-molecular ion, which best reflects the structure of the substance (its molecule). Hence, in the present invention, the quasi-molecular ion can also be introduced into the target chamber.

BRIEF DESCRIPTION OF THE DRAWINGS

FIG. 6 shows a CID spectrum and a charge inverted spectrum for $CD_3OH^+$;

FIG. 7 shows a CID spectrum and a charge inverted spectrum for $CH_3OD^+$;

DETAILED DESCRIPTION OF THE INVENTION

Figure 1:
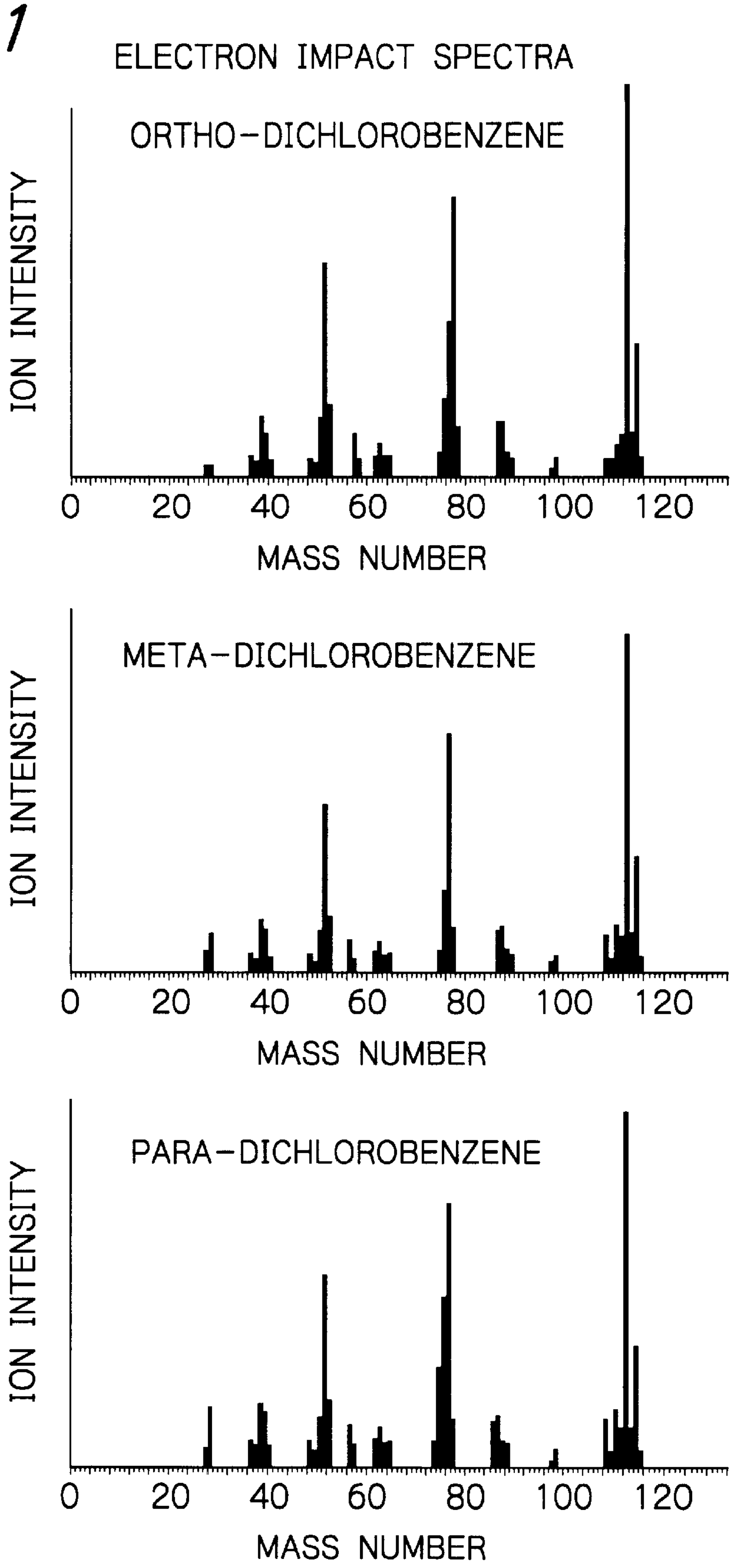
FIG. 1 shows electron impact spectra for ortho-, meta- and para-dichlorobenzenes.

The concept of the charge inversion mass spectrometry of the invention may be represented as follows: ion source (generation of a positive ion)→mass separation of the positive ion (after mass spectroscopy in an electric or magnetic field, the positive ion of interest is mass separated)→target chamber filled with a target of low ionization energy such as an alkali metal (where the positive ion is converted to a negative ion)→mass spectroscopy of the negative ion→detector.

Bombarding a positive (or negative) ion against a rare gas target and detecting a positive (or negative) ion generated by dissociation has heretofore been used as a CID method. The charge inversion mass spectrometry of the invention has the advantage of enabling the differentiation of those isomers which have been impossible to differentiate by CID and other conventional mass spectroscopic techniques. This is because the conventional mass spectroscopic techniques involve dissociation from an ion having a broad internal energy distribution whereas the charge inverted mass spectroscopy relies upon dissociation from a neutral species having a very narrow internal energy distribution.

The method of the invention also differs from the conventional techniques in that a target of low ionization energy such as an alkali metal is introduced in vapor form into the target chamber and that the incident ion is a positive ion whereas an oppositely charged negative ion is detected. The positive ion is generated in the ion source. To generate the positive ion useful in the method of the invention, any of the ionization methods used in mass spectroscopy may be employed, as exemplified by electron impact ionization, chemical ionization and fast atom bombardment. The generated positive ion is subjected to mass spectroscopy in an electric or magnetic field. The mass separated positive ion is launched into the target chamber filled with the vapor of a target of low ionization energy such as an alkali metal.

In the target chamber, a negative ion is produced by one of two processes. In a single-collision, double electron transfer process which is linearly proportional to the density of the vapor of a target of low ionization energy such as an alkali metal, dissociation does not usually accompany and the cross-sectional area for the generation of negative ions is small. The other process is a double collision, successive single-electron transfer process which is proportional to quadratic dependence the density of the target vapor. In this process, an excited neutral species is generated by a near resonant electron and dissociated into neutral fragments, which in turn collide with another target such as an alkali metal to produce a negative ion by a second occurrence of the single-electron transfer. In this process, dissociation occurs after neutralization and its pattern varies not only with the positive ion of an isomer but also with the type of the target vapor (whether it is an alkali metal or something else). The resulting negative ion leaves the target chamber. The emerging negative ion is subjected to mass spectroscopy before it is detected. In this manner, the generated negative ion undergoes mass spectroscopy to yield a charge inverted spectrum for the isomer of interest.

Electron transfer between an ion (or neutral species) in flight and the target is initiated by collision. If a single collision causes transfer of two electrons at a time, the process is called “single-collision, double electron transfer”. Since a negative ion results from a single collision, the process is in linear proportion to the density of the vapor of the target such as an alkali metal.

In the other process called “double-collision, continuous single-electron transfer”, a positive ion undergoes one collision with the target to become a neutral species, with single-electron transferred, and the resulting neutral species (to be exact, a neutral species dissociated from that neutral species) collides with another target to become a negative ion, with another electron being transferred. Since two target collisions occur, the process is proportional to quadratic dependence the density of the vapor of the target such as an alkali metal and the dissociation of the second neutral species from the first neutral species enables the method of the invention to distinguish between isomers.

In the examples that follow, one target chamber is used. However, since the double-collision process is also involved, charge inverted mass spectroscopy can also be performed using two target chambers. In this case, different targets may be employed in the two target chambers.

In the charge inversion mass spectrometry of the invention, both an incident positive ion and a negative ion to be detected are analyzed. In order to set the conditions for measurement, the apparatus has the second mass spectrometer that allows for analysis of positive ions. Negative ions can be analyzed by the same method except for the polarities of electric and magnetic fields to be applied. In the examples that follow, positive and negative ions are analyzed by a sector arrangement using an electric field and a magnetic field. Instead, the quadruple, ion trap and all other conventional methods of mass spectroscopy may be substituted.

Controlling the density of the vapor of the target such as an alkali metal is critical to the invention. If the density is unduly low, the intensity of a negative ion relative to a positive ion is insufficient to produce a spectrum with adequate intensity of negative ions. If the density is excessive, the incident ion and the generated negative ion are scattered by multiple collisions and too much attenuated to produce high spectral resolution. The results shown in the examples that follow are those obtained by using alkali metals Cs and K as the target. Similar results are obtained with other alkali metals such as Li, Na and Rb that have low ionization energy.

The following are non-limiting examples of the invention.

EXAMPLE 1

Differentiating ortho-, meta- and para-isomers of dichlorobenzene

In electron impact ionization and collision-induced dissociation, ortho-, meta- and para-dichlorobenzenes give identical spectra and cannot be differentiated from one another. This is not the case with the charged inverted mass spectroscopic method of the invention and those isomers can be clearly differentiated.

Figure 2:
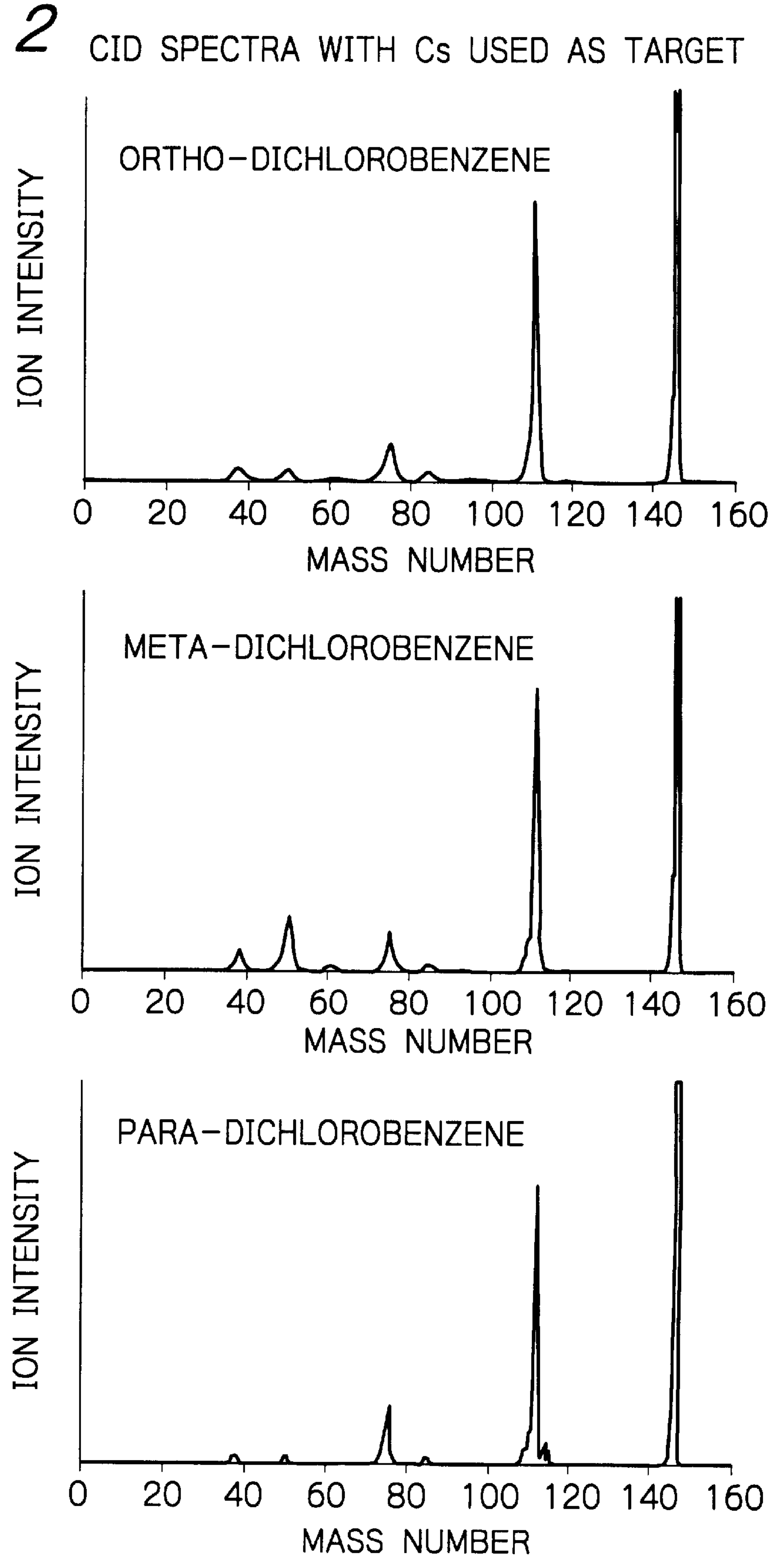
FIG. 2 shows CID spectra for ortho-, meta- and para-dichlorobenzenes with Cs used as a target.
Figure 3:
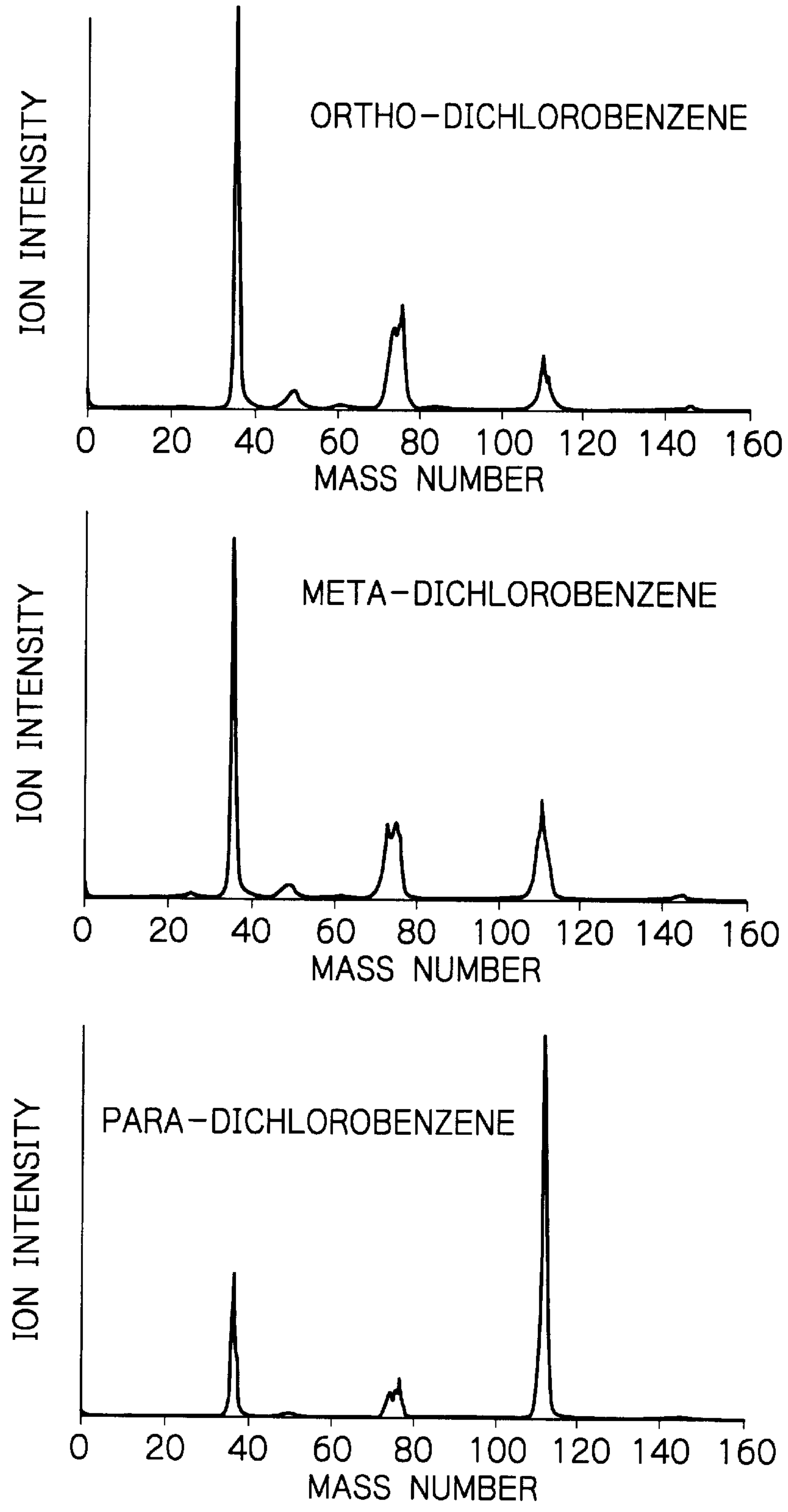
FIG. 3 shows charge inverted spectra for ortho-, meta- and para-dichlorobenzenes with Cs used as a target.
Figure 4:
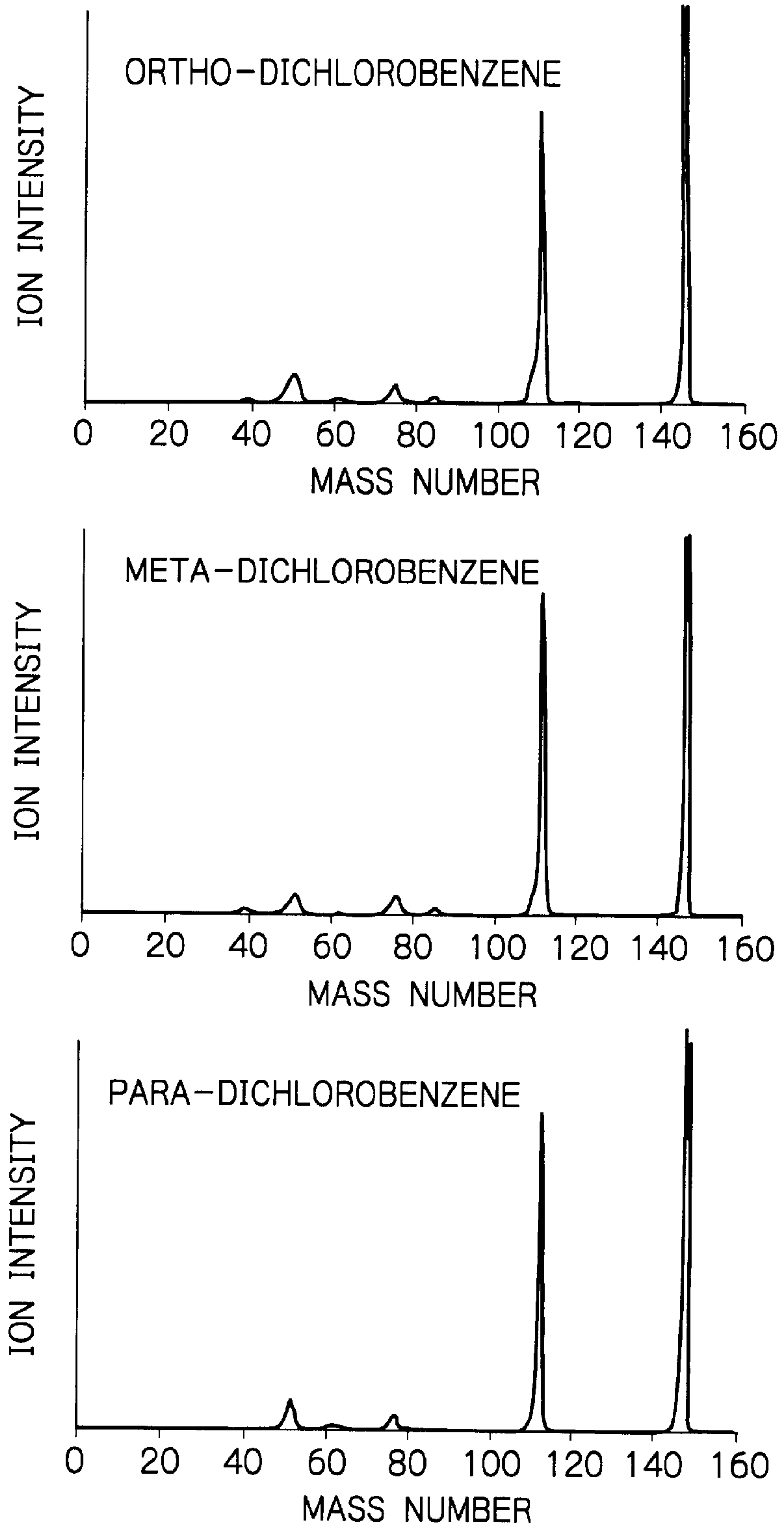
FIG. 4 shows CID spectra for ortho-, meta- and para-dichlorobenzenes with K used as a target.

FIG. 1 shows electron impact spectra for ortho-, meta- and para-dichlorobenzenes; FIGS. 2 and 3 show CID and charge inverted spectra, respectively, for the same isomers with Cs used as a target; and FIGS. 4 and 5 show CID and charge inverted spectra, respectively, for the same isomers with K used as a target.

As is clear from FIG. 1, ortho-, meta- and para-dichlorobenzenes are indistinguishable in electron impact spectra. In FIG. 2 showing the CID spectra with the target Cs, meta-dichlorobenzene has a characteristic peak and gives a certain difference in intensity at m/z=50 but no such difference is found in FIG. 4 showing the CID spectra with the target K.

Figure 5:
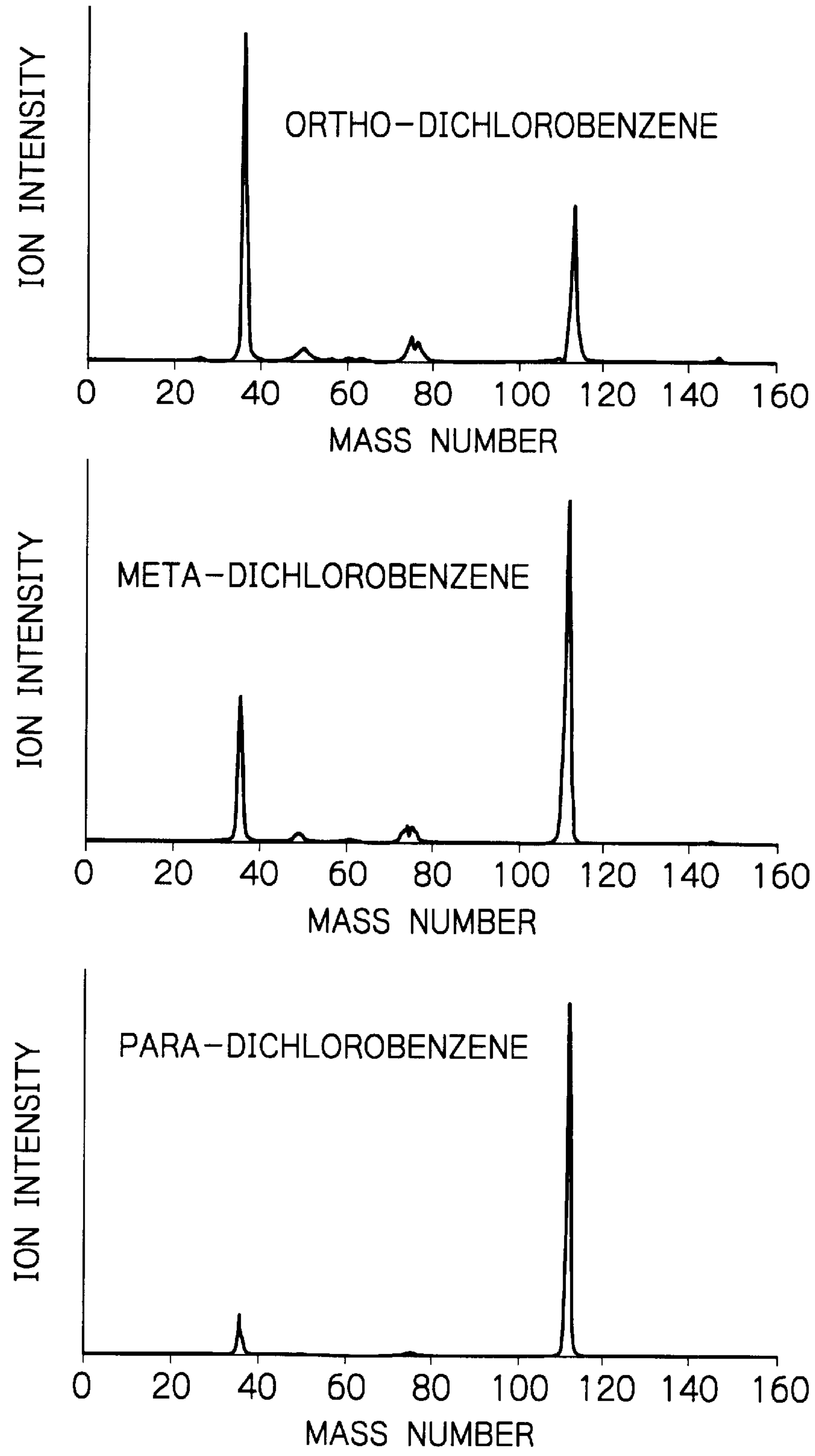
FIG. 5 shows charge inverted spectra for ortho-, meta- and para-dichlorobenzenes with K used as a target.

In contrast, the differences between ortho-, meta- and para-dichlorobenzenes are apparent in the charge inverted spectra irrespective of whether the target is Cs (FIG. 3) or K (FIG. 5). Thus, charge inverted spectra allow for clear distinction between those isomers which are almost insensitive to differentiation by analysis of electron impact spectra and CID spectra.

The isomerism of ortho-, meta- and para-dichlorobenzenes depends on the substitution position of chlorine atoms on the benzene ring. The clear distinction that is observed between the charge inverted spectra for these isomers suggests the possibility for analysis and determination in small quantities of dioxins and other isomeric substances by mass spectroscopy.

EXAMPLE 2

Differences Between Ion Dissociation by CID and Dissociation of Neutral Species by Charge Inverted Mass Spectroscopy, as Highlighted by Use of Partially Deuterated $CD_3OH^+$ and $CH_3OH^+$ Ions FIG. 6 shows a CID spectrum and a charge inverted spectrum for $CD_3OH^+$, and FIG. 7 shows a CID spectrum and a charge inverted spectrum for $CH_3OD^+$. The $CH_3OH^+$ ion, whether it is in a CID spectrum or a charge inverted spectrum, has a predominant peak at a mass number of 31 with one hydrogen atom eliminated and the other peaks are very weak.

As is clear from FIG. 6, the CID spectrum of the $CD_3OH^+$ ion substituting deuterium for each of the hydrogen atoms in the methyl group shows only the $CD_2OH^+$ ion (mass number decreased by 2) and the presence of the $CD_3O^+$ ion (mass number decreased by 1) is negligible. On the other hand, the charge inverted spectrum of the $CD_3OH^+$ ion shows only the $CD_3O^-$ ion (mass number decreased by 1) and the presence of the $CD_2OH^-$ ion (mass number decreased by 2) is negligible.

As is clear from FIG. 7, the CID spectrum of the $CH_3OD^+$ ion substituting deuterium for the hydrogen atom in the hydroxyl group shows only the $CH_2OD^+$ ion (mass number decreased by 1) and the presence of the $CH_3O^+$ ion (mass number decreased by 2) is negligible. On the other hand, the charge inverted spectrum of the $CH_3OD^+$ ion shows only the $CH_3O^-$ ion (mass number decreased by 2) and the presence of the $CH_2OD^-$ ion (mass number decreased by 1) is negligible.

These results clearly show that a hydrogen in the methyl group is eliminated in ion dissociation (see the CID spectra) whereas the hydrogen atom in the hydroxyl group is eliminated in the dissociation of a neutral species (see the charge inverted spectra). Conversely, dissociation from a radical cation is observed in the CID spectra but dissociation from a neutral molecule is observed in the charge inverted spectra.

Neutral molecules usually have closed electron shells and, hence, their isomerization energy is higher than that of radical cations with open shells. Charge inverted mass spectroscopy depends on the dissociation of a neutral molecule which is less likely to be isomerized than ions and this is why isomers can be differentiated at high resolution by charge inverted mass spectroscopy as demonstrated in Example 1.

EXAMPLE 3

Measuring the Internal Energy Distribution Using a Thermometer Molecule Ion $W(CO)_n^+$ (n=4–6)

A compound like $W(CO)_6$ which is commonly called a "thermometer molecule" has been used to measure the internal energy distributions of ions generated in electron impact spectra, CID spectra and surface-induced dissociation (SID) spectra. Using Cs as a target, CID and charge inverted spectra were measured for $W(CO)_n^+$ (n=4–6) generated by electron bombardment of $W(CO)_6$ to determine the internal energy distributions in CID and charge inverted mass spectroscopy.

Figure 8A:
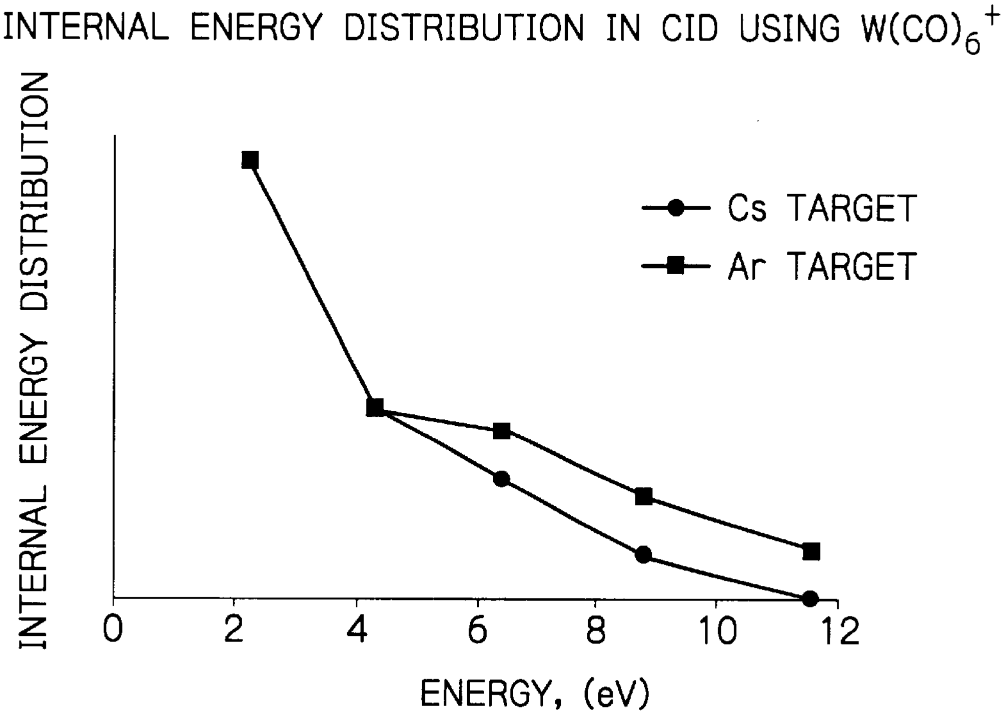
FIG. 8*a* shows the internal energy distribution in CID on $W(CO)_6^+$.
Figure 8B:
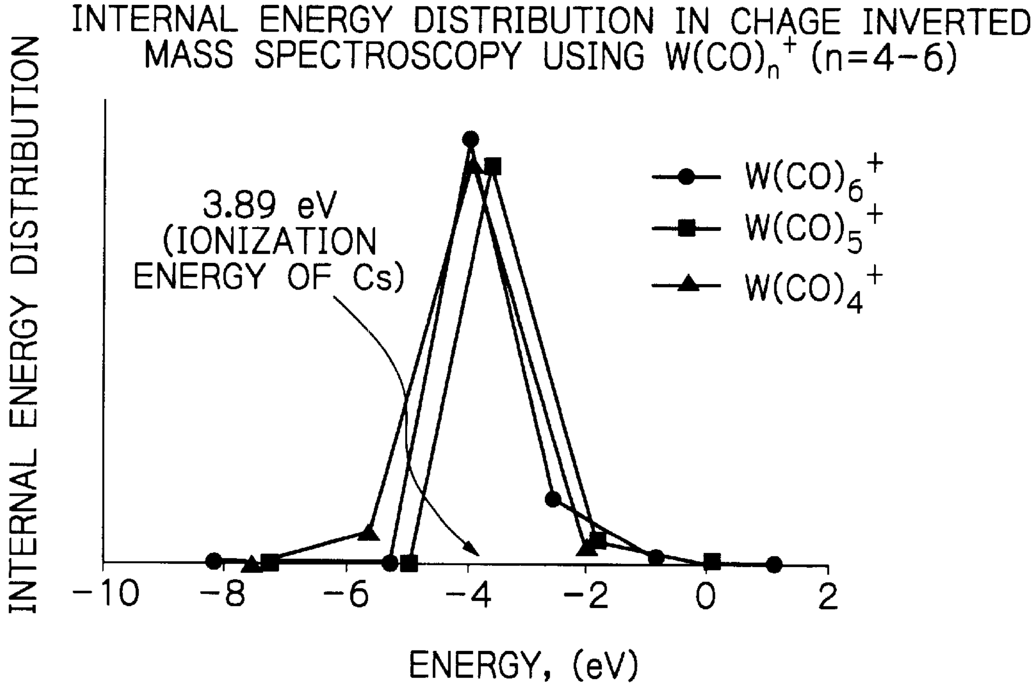
FIG. 8*b* shows the internal energy distribution in charge inverted mass spectroscopy on $W(CO)_n^+$ (n=4–6).

FIG. 8*a* shows the internal energy distribution in CID on $W(CO)_6^+$ (Cs used as target) together with documented data for CID spectra that were obtained with Ar used as the target. FIG. 8*b* shows the internal energy distribution in charge inverted mass spectroscopy on $W(CO)_n^+$ (n=4–6).

The internal energy distribution in CID agrees with the documented data for the use of Ar as target and it is broad enough to show a progressive decrease in intensity as the incident energy increases. This means that CID spectra consist of superposed contributions from various mechanisms of dissociation involving different internal energies.

In contrast, the internal energy distribution in charge inverted mass spectroscopy is concentrated in a position that is lower than the energy level of the incident ion by 3.89 eV which is the ionization energy of Cs and the half-peak width of energy is as small as about 2 eV.

Hence, it has become clear that in charge inverted mass spectroscopy, neutralization occurs by near resonance and the resulting excited neutral species is dissociated. Compared to CID, the internal energy distribution is narrow enough to permit selective occurrence of a specified dissociation reaction and this is why isomers can be differentiated at high resolution by charge inverted mass spectroscopy as demonstrated in Example 1.

The charge inversion mass spectrometry of the invention which relies upon the dissociation of a neutral species offers the following unique advantages:

(1) Compared to CID, the internal energy distribution is narrow enough to permit selective occurrence of a specified dissociation reaction, thus providing high resolution in isomer differentiation;

(2) Isomers can be differentiated and quantitatively determined with far smaller quantities of samples than have been required in the conventional methods;

(3) Isomers can be differentiated at high resolution by mass spectroscopy while retaining its capability for microanalysis; and (4) Dioxins and other isomeric substances can be analyzed and quantitatively determined in small quantities by mass spectroscopy.

What is claimed is:

1. A method for a charge inversion mass spectrometry of a substance comprising ionizing the substance in an ionizing source to generate a positive ion of a parent ion, a fragment ion or a quasi-molecular ion, mass separating the generated positive ion by mass spectroscopy in an electric or magnetic field, launching the mass separated positive ion to a target of low ionization energy in a target chamber to generate an excited neutral species, launching the neutral species to another target to produce a negative ion, recovering the produced negative ion, and measuring the mass spectrum of the recovered negative ion to identify the substance and determine its quantity.

2. The method according to claim 1, wherein said negative ion is generated from the positive ion in the target chamber by a double-collision, continuous single-electron transfer process which is proportional to quadratic dependence the density of said target and in which an excited neutral species is generated, dissociated into a neutral fragment and allowed to collide with another target in metal vapor so that a negative ion is generated by a second occurrence of a single-electron transfer.

3. The method of claim 2 wherein the excited neutral species is generated by a near resonant electron.

4. The method according to claim 1, wherein the alkali metal is Li, Na, K, Rb, Cs or Fr.

5. The method according to claim 2, wherein the alkali metal is Li, Na, K, Rb, Cs or Fr.

6. The method according to claim 3, wherein the alkali metal is Li, Na, K, Rb, Cs or Fr.

* * * * *